United States Patent
Wang et al.

(10) Patent No.: US 9,217,202 B2
(45) Date of Patent: Dec. 22, 2015

(54) MEMBRANE REACTOR

(75) Inventors: Cheng Wang, Beijing (CN); Chen-Chen Zhao, Beijing (CN); Zhi-Xiang Liu, Beijing (CN); Jian-Wei Guo, Beijing (CN); Xiang-Ming He, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/567,155

(22) Filed: Aug. 6, 2012

(65) Prior Publication Data

US 2013/0146448 A1  Jun. 13, 2013

(30) Foreign Application Priority Data

Dec. 12, 2011 (CN) .......................... 2011 1 0411730

(51) Int. Cl.
| C25B 11/03 | (2006.01) |
|---|---|
| C25B 1/46 | (2006.01) |
| C25B 1/10 | (2006.01) |
| C25B 9/12 | (2006.01) |
| C25C 7/00 | (2006.01) |
| C25B 3/04 | (2006.01) |
| C25B 9/08 | (2006.01) |
| C25B 15/08 | (2006.01) |
| C25B 1/02 | (2006.01) |
| C25B 9/16 | (2006.01) |
| H01M 16/00 | (2006.01) |

(52) U.S. Cl.
CPC ... *C25B 3/04* (2013.01); *C25B 1/02* (2013.01); *C25B 9/08* (2013.01); *C25B 9/166* (2013.01); *C25B 15/08* (2013.01); *H01M 16/003* (2013.01)

(58) Field of Classification Search
CPC ........ C25B 11/00; C25B 11/03; C25B 11/35; C25B 1/10; C25B 9/12; C25C 7/00; C25C 7/02; C25C 7/05
USPC .......................... 204/265, 280, 283, 842, 242
See application file for complete search history.

(56) References Cited

U.S. PATENT DOCUMENTS

| 2,827,426 | A | * | 3/1958 | Bodamer ...................... 205/512 |
|---|---|---|---|---|
| 3,168,458 | A | * | 2/1965 | Sprague ........................ 204/237 |
| 4,510,034 | A | * | 4/1985 | Ohshima et al. .............. 204/284 |
| 6,051,117 | A | * | 4/2000 | Novak et al. .................. 204/252 |
| 7,244,524 | B2 | * | 7/2007 | McCluskey et al. .............. 429/9 |
| 2004/0074780 | A1 | * | 4/2004 | Twardowski et al. ......... 205/618 |
| 2005/0122653 | A1 | | 6/2005 | McCluskey et al. |
| 2008/0107949 | A1 | * | 5/2008 | Yoshie et al. .................... 429/33 |
| 2011/0114502 | A1 | * | 5/2011 | Cole et al. ....................... 205/414 |
| 2012/0125780 | A1 | * | 5/2012 | Oakes et al. .................. 205/340 |
| 2012/0292187 | A1 | * | 11/2012 | Kim et al. ...................... 204/527 |

* cited by examiner

*Primary Examiner* — Zulmariam Mendez
(74) *Attorney, Agent, or Firm* — Novak Druce Connolly Bove + Quigg LLP

(57) ABSTRACT

A membrane reactor used for electrochemically converting a carbon dioxide gas into an expected product includes a cavity, a solid electrolyte membrane separator, a cathode, an anode, and a power source. The solid electrolyte membrane separator is disposed in the cavity and divides the cavity into two chambers defined as a cathode chamber and an anode chamber. The cathode is disposed in the cathode chamber, and the anode is disposed in the anode chamber. The cathode is a trickle bed structure including a porous conductive layer and cathode particles disposed on the porous conductive layer. The power source is disposed outside the cavity to provide an electrolytic voltage.

12 Claims, 4 Drawing Sheets

MEMBRANE REACTOR

CROSS-REFERENCE TO RELATED APPLICATIONS

This application claims all benefits accruing under 35 U.S.C. §119 from China Patent Application No. 201110411730.7, filed on Dec. 12, 2011, in the China Intellectual Property Office, the contents of which are hereby incorporated by reference. This application is related to common-assigned applications entitled, "MEMBRANE REACTOR," filed Aug. 6, 2012 Ser. No. 13/567,172; "METHOD FOR ELECTROCHEMICALLY CONVERTING CARBON DIOXIDE," filed Aug. 6, 2012 Ser. No. 13/567,169.

BACKGROUND

1. Technical Field

The present disclosure relates to a membrane reactor for electrochemically convert carbon dioxide.

2. Description of Related Art

Carbon dioxide ($CO_2$) is considered as the main anthropogenic cause of climate change, such as the greenhouse effect. Converting $CO_2$ to useful industrial chemicals containing carbon or fuels is a proper way for realizing a sustainable development of energy and environment.

Ways of converting $CO_2$ includes chemical conversion, biochemical conversion, photochemical reduction, electrochemical reduction, and inorganic transformation. The advantages of electrochemical reduction of $CO_2$ include low cost, simple fabrication system, and mild operation condition.

Electrolytic cells are used as reactors for electrochemically reducing $CO_2$. However, the electrolytic cells have low conversion efficiencies and flux. These disadvantages limit the electrolytic cells for a commercializing application.

What is needed, therefore, is to provide a membrane reactor which has a high conversion efficiency of electrochemical reduction of $CO_2$.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
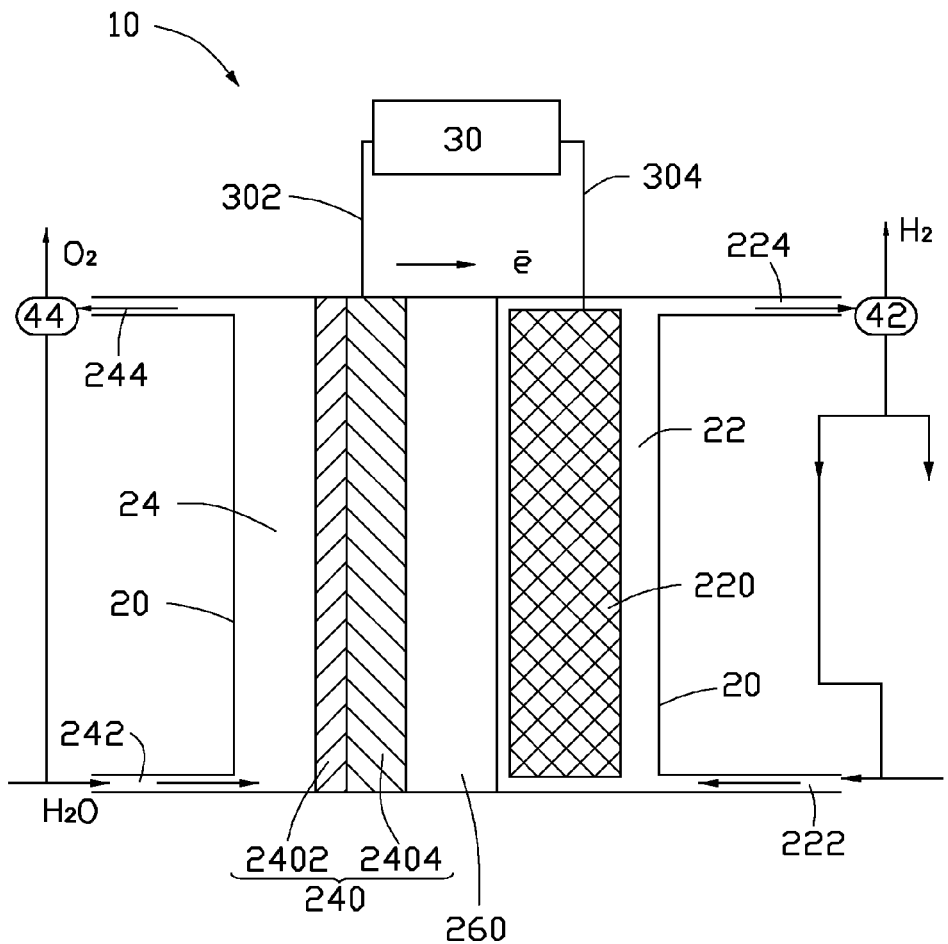
FIG. 1 is a sectional front view of one embodiment of a membrane reactor.
Figure 2:
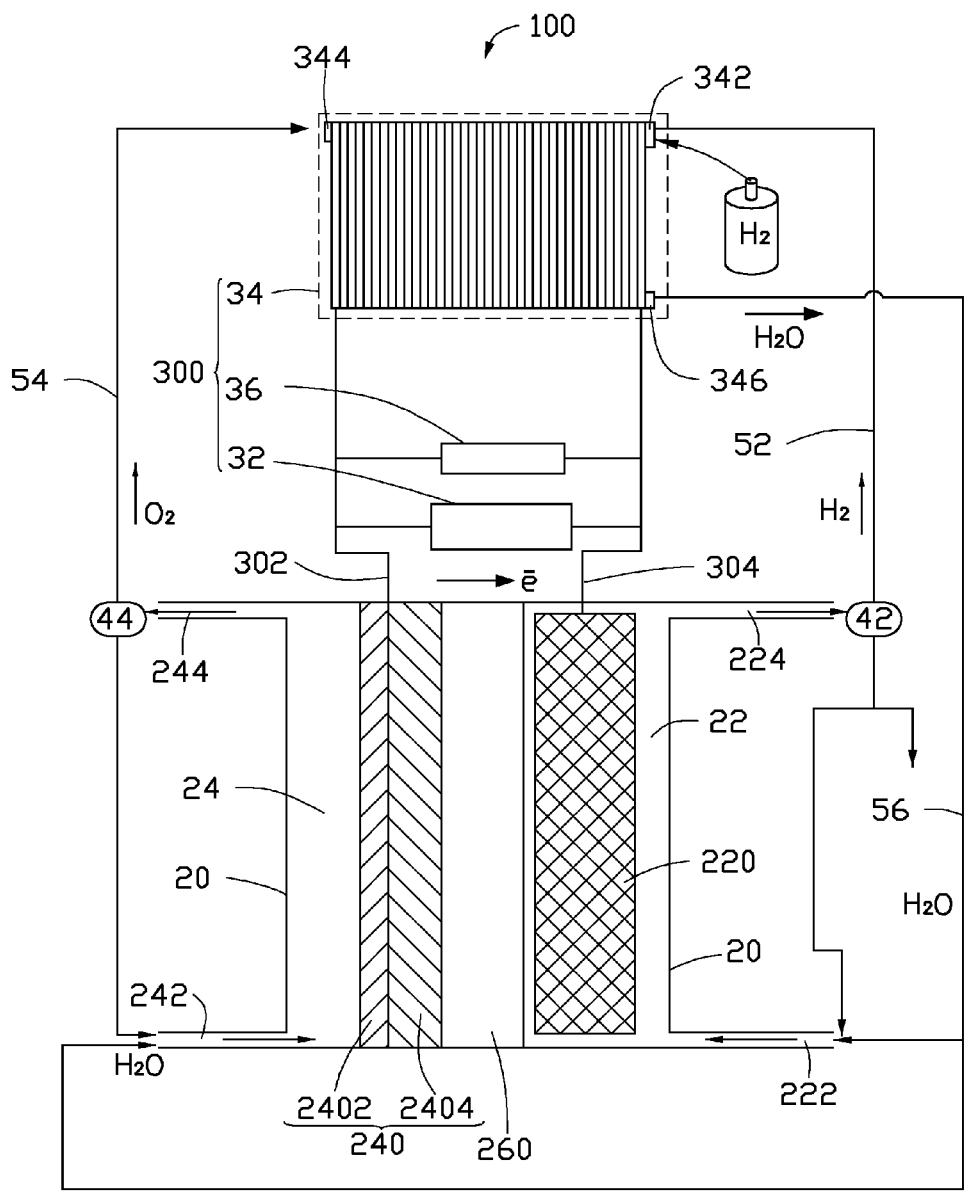
FIG. 2 is a sectional front view of another embodiment of a membrane reactor having a fuel cell.
Figure 3:
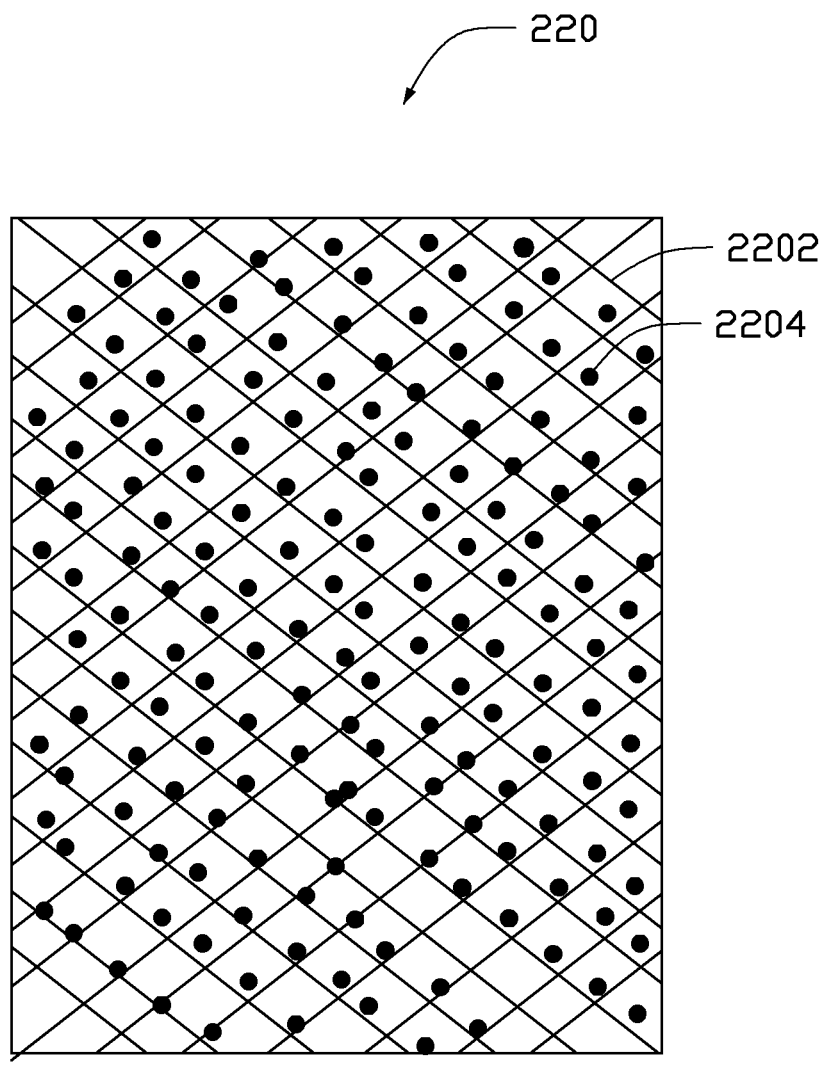
FIG. 3 is a front view of a structure of a cathode of the membrane reactor.
Figure 4:
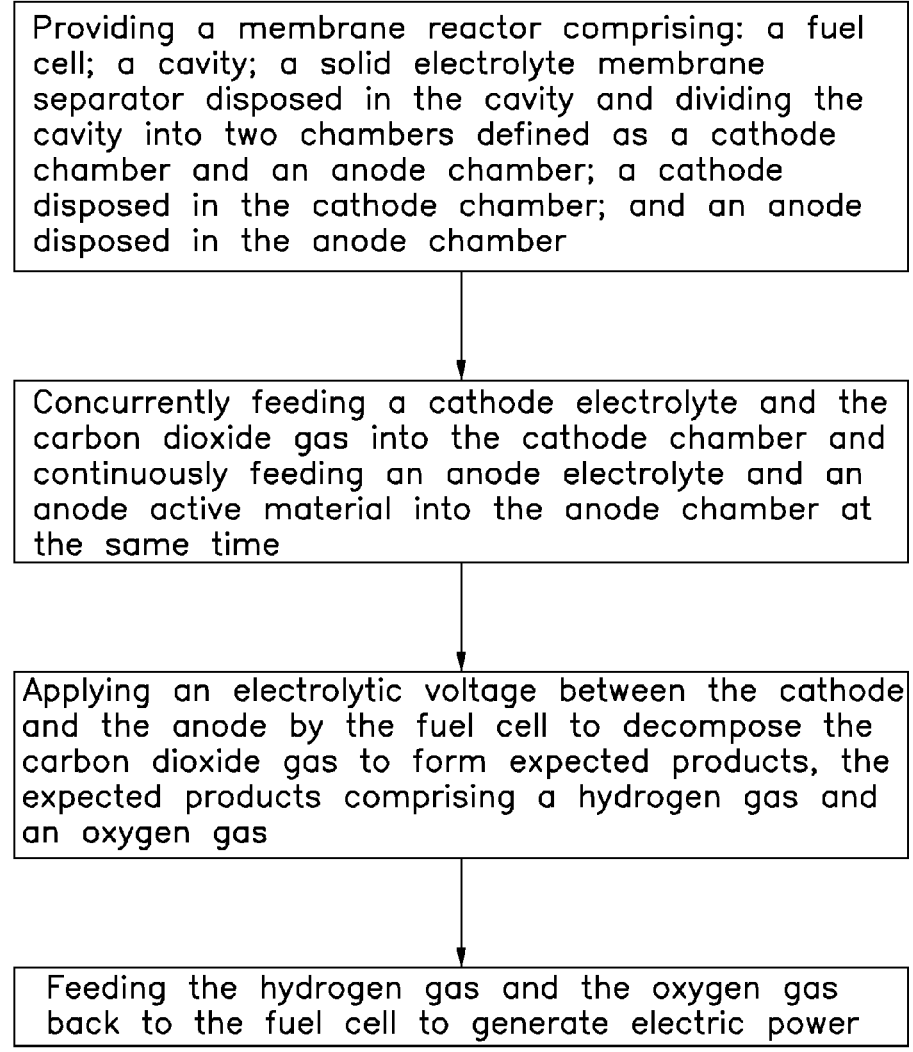
FIG. 4 is a flow chart of one embodiment of a method for electrochemically reducing $CO_2$ to expected products.

Referring to FIGS. 1-3, one embodiment of a membrane reactor 10 or 100, used for electrochemical reduction of a $CO_2$ gas, includes a cavity 20, a power source 30 or 300, a solid electrolyte separator 260, a cathode 220, and an anode 240. The solid electrolyte separator 260 is disposed in the cavity 20. The cavity 20 is divided into two chambers by the solid electrolyte separator 260 which are defined as a cathode chamber 22 and an anode chamber 24. The cathode 220 is disposed in the cathode chamber 22. The anode 240 is disposed in the anode chamber 24. The cathode 220 and the anode 240 are separated by the solid electrolyte separator 260. The power source 30 or 300 is disposed outside the cavity 20. The power source 30 or 300 has a positive electrode 302 and a negative electrode 304. The positive electrode 302 of the power source 30 or 300 is electrically connected with the cathode 240, and the negative electrode 304 is electrically connected with the anode 220.

The cathode 240 is a trickle bed structure including a porous conductive layer 2202 and a plurality of cathode catalyst particles 2204 disposed on the porous conductive layer 2202. The plurality of cathode catalyst particles 2204 are used to electrochemically reduce the $CO_2$ gas.

The porous conductive layer 2202 is a support skeleton. A plurality of holes are defined in the support skeleton. A porosity of the porous conductive layer 2202 can be in a range from about 30% to about 90% to give the cathode 220 good mechanical strength and fast proton transfer rate during the electrochemical reduction of the $CO_2$ gas. A diameter of the plurality of holes can be in a range from about 50 micrometers to about 2000 micrometers. The porous conductive layer 2202 has a certain thickness, which gives the cathode 220 a three-dimensional structure. The thickness of the porous conductive layer 2202 can be in a range from about 2 millimeters to about 30 millimeters. In one embodiment, the thickness of the porous conductive layer 2202 is in a range from about 2.1 millimeters to about 20 millimeters. The proton transfer rate and an electron transfer rate during the electrochemical reduction of the $CO_2$ gas can be increased for the porous conductive layer 2202 with the certain thickness. Each of the plurality of holes is a through hole extending from one side to the other side of the porous conductive layer 2202 in a straight or curvy manner. The extending directions of the plurality of holes can be substantially the same as the direction of the thickness of the porous conductive layer 2202, thus the through holes can be straight or curvy cylinders. In one embodiment, the through holes are all curvy cylinders to increase contact areas between the cathode catalyst particles 2204 and reactants in the cathode chamber 22. Accordingly, a catalytic efficiency of the cathode catalyst particles 2204 and conversion efficiency of the $CO_2$ gas can be increased. A material of the porous conductive layer 2202 can be a metal or alloy resistant to corrosion, such as titanium, nickel, or stainless steel. The plurality of cathode catalyst particles 2204 can be uniformly dispersed in the holes and deposited on inner walls of the holes. The plurality of cathode catalyst particles 2204 can also be disposed on an outside surface of the porous conductive layer 2202 between the solid electrolyte separator 260 and the porous conductive layer 2202. A diameter of the cathode catalyst particles 2204 is smaller than the diameter of the holes, and can be in a range from about 1 micrometer to about 1000 micrometers. A material of the cathode catalyst particles 2204 can be zinc, cadimium, indium, titanium, tin, lead, bismuth, palladium, platinum, copper, silver, gold, or an alloy or oxide thereof. The cathode catalyst particles 2204 can be carried on carriers. The carriers can be carbon nanotubes or graphene sheets. The cathode catalyst particles 2204 can be located on surfaces of the carbon nanotubes or graphene sheets. A mass percentage of the cathode catalyst particles 2204 to the cathode catalyst particles 2204 and the carriers can be equal to or higher than 10 wt %.

The cathode chamber 22 further includes a cathode inlet 222 and a cathode outlet 224. The cathode inlet 222 is disposed at a bottom of the cavity 20. A cathode electrolyte and the $CO_2$ gas are concurrently fed from the cathode inlet 222 and undergo an electrochemically reducing reaction in the cathode chamber 22 to form cathode reaction products. The cathode reaction products are flowed out along with the rest of the cathode electrolyte from the cathode outlet 224. The membrane reactor 10 or 100 further includes a cathode separating device 42 used for separating the cathode reaction products and the rest of the cathode electrolyte.

There is no stirrer in the cathode chamber 22, and a flow rate of the cathode electrolyte is low, thus damage to the cathode catalyst particles 2204 can be decreased and a working life of the catalyst particles 2204 can be prolonged.

The anode 240 can be a porous diffusion electrode including a porous diffusion layer 2402 and an anode catalyst layer 2404 disposed on a surface of the porous diffusion layer 2402. The anode catalyst layer 2404 is disposed between the porous diffusion layer 2402 and the solid electrolyte separator 260. A distance between the anode catalyst layer 2404 and the solid electrolyte separator 260 can be in a range from about 0 micrometers to about 10 micrometers. In one embodiment, the distance between the anode catalyst layer 2404 and the solid electrolyte separator 260 is about 0 micrometers which can increase a current efficiency of the membrane reactor 10 or 100.

The porous diffusion layer 2402 can be made of a porous material resistant to corrosion. The porous material can be a porous carbon containing material or a porous metallic material. The porous carbon containing material can be carbon paper, carbon cloth, or carbon felt. The porous metallic material can be a mesh of stainless steel, titanium, or nickel. A thickness of the porous diffusion layer 2402 can be in a range from about 0.1 millimeters to about 3 millimeters. A porosity of the porous diffusion layer 2402 can be in a range from about 50% to about 90%. A diameter of the pores of the porous diffusion layer 2402 can be in a range from about 1 micrometer to about 100 micrometers. In one embodiment, the diameter of the pores is in a range from about 10 micrometers to about 50 micrometers. The anode catalyst layer 2404 includes a plurality of well dispersed anode catalyst particles or a continuous anode catalyst coating. A material of the anode catalyst layer 2404 can be at least one of platinum, ruthenium, iridium, gold, nickel, cobalt, zinc, silver, an alloy or oxide thereof, manganese dioxide, $LaNi_5$, and $LaNiO_2$. The anode catalyst layer 2404 can be disposed on the surface of the porous diffusion layer 2402 by coating methods.

The anode chamber 24 further includes an anode inlet 242 and an anode outlet 244. The anode inlet 242 is disposed at a bottom of the anode chamber 24. An anode electrolyte and anode active materials can be fed from the anode inlet 242 and undergo an electrochemical oxidation reaction to form anode reaction products. The anode reaction products are flowed out along with the rest of the anode electrolyte from the anode outlet 244. The membrane reactor 10 or 100 further includes an anode separating device 44 used for separating the anode reaction products and the rest anode electrolyte.

The cathode 220 and the anode 240 are separated by the solid electrolyte separator 260. The cathode 220, the solid electrolyte separator 260, and the anode 240 can form a multi-layered structure. The anode catalyst layer 2404, porous diffusion layer 2402, solid electrolyte separator 260, and the porous conductive layer 2202 can be stacked together to form a membrane shaped structure. A distance between the cathode 220 and the solid electrolyte separator 260 can be in a range from about 0 centimeters to about 5 centimeters for a high electrolysis efficiency of the membrane reactor 10 or 100. In one embodiment, the distance between the cathode 220 and the solid electrolyte separator 260 is about 1 centimeter. Certain amounts of cations can selectively pass the solid electrolyte separator 260 from the anode 240 to the cathode to balance a stoichiometric ratio of ions in the cathode 220 and the anode 240.

The solid electrolyte separator 260 can be a cation exchange membrane. In one embodiment, the solid electrolyte separator 260 is an enhanced cation exchange membrane, such as enhanced perfluoro sulfonate membrane, enhanced perfluorocarboxylic acid membrane, or a composite membrane thereof. The enhanced cation exchange membrane has good strength and low swelling ratio which can prevent the solid electrolyte separator 260 from creep or being folded, bubbled, or delaminated during a working process of the membrane reactor 10 or 100. Therefore, a structural stability of the membrane reactor 10 or 100 can be increased. The enhanced cation exchange membrane can be fabricated by compositing a cation exchange membrane commonly used with an enhanced material, such as a polytetrafluoroethylene membrane composites with a porous membrane made by other materials. A thickness of the solid electrolyte separator 260 can be in a range from about 50 micrometers to about 500 micrometers.

The power source 30 or 300 is used to provide an electrolytic voltage for the electrochemical reduction of the $CO_2$ gas. Wind energy, photovoltaic energy, or electrochemical energy can be used as the power source 30 or 300.

Referring to FIG. 2, the power source 300 of the membrane reactor 100 can further include a direct current power supply 32 and a charge power supply 34 electrically connected with the direct current power supply 32 in parallel. The direct current power supply 32 directly provides the electrolytic voltage for the electrochemical reduction of the $CO_2$ gas. The charge power supply 34 is used to charge the direct current power supply 32.

The power source 300 further includes a power controller 36 electrically connected with the direct current power supply 32 and the charge power supply 34 in parallel, and used to convert the power generated by the charge power supply 34 into a direct current power needed by the membrane reactor 100.

In one embodiment, the charge power supply 34 is an electrochemical power supply, such as a fuel cell. The fuel cell can be an alkaline fuel cell, a solid oxide fuel cell, or a proton exchange membrane fuel cell. The proton exchange membrane fuel cell can be an air-cooled or a self-humidifying proton exchange membrane fuel cell. The fuel cell includes a plurality of fuel cell monomers electrically connected in series. The fuel cell includes a fuel inlet 342, an oxidant inlet 344, and a reaction product outlet 346. The fuel can be hydrogen or methanol. The oxidant can be air or oxygen. The reaction products of the fuel and oxidant, such as water, can be flowed out from the outlet 346. The fuel cell also includes a fuel outlet and an oxidant outlet used for outputting the fuel and oxidant not reacted.

If the cathode reaction products include a hydrogen gas, the membrane reactor 100 further includes a hydrogen deliver channel 52 connected between the fuel inlet 342 and the cathode separating device 42 to deliver the hydrogen gas to the fuel cell. If the anode reaction products include an oxygen gas, the membrane reactor 100 further includes an oxygen deliver channel 54 connected between the oxidant inlet 344 and the anode separating device 44 to deliver the oxygen gas to the fuel cell. In addition, the membrane reactor 100 can further include water delivering channel 56. The reaction product outlet 346 can be connected with at least one of the cathode inlet 222 and the anode inlet 224 via the water delivering channel 56 to use water as a solvent supplied for the cathode electrolyte or anode electrolyte.

Referring to FIG. 1 to FIG. 4, one embodiment of a method for electrochemically converting the $CO_2$ gas includes the following steps:

S1, providing the membrane reactor 10 or 100;

S2, concurrently feeding the cathode electrolyte and the $CO_2$ gas into the cathode chamber 22 and flowing through the cathode catalyst particles 2204 in the trickle bed structure, and at the same time, continuously feeding the anode electrolyte and the anode active material into the anode chamber 24; and S3, applying the electrolytic voltage between the cathode 220 and the anode 240 to decompose the $CO_2$ gas to form expected products.

In step S2, the cathode electrolyte and the $CO_2$ gas are concurrently flowed from bottom up through the cathode catalyst particles 2204 disposed in the porous conductive layer 2202. The cathode electrolyte and the $CO_2$ gas are inputted from one end of the holes and flowed out from the other end of the holes and flows through the porous conductive layer 2202. More specifically, the cathode electrolyte as liquid drops is trickled through the cathode catalyst particles 2204 disposed inside the porous conductive layer 2202, and the $CO_2$ gas is continuously passed through the cathode catalyst particles 2204 at the same time. The cathode electrolyte and the $CO_2$ gas are mixed as a plug flow, and passed through the cathode particles 2204. The $CO_2$ gas can be fed in the cathode chamber 22 after boosting so that the $CO_2$ gas continuously can flow through the cathode catalyst particles 2204. A volume ratio of the cathode electrolyte and the $CO_2$ gas can be in a range from about 1:4 to about 1:8. A pressure in the cathode chamber 22 can be in a range from about 0.5 atmospheres of pressure to about 8 atmospheres of pressure.

In step S3, the electrolytic voltage can be in a range from about 2 V to about 5 V. In one embodiment, the electrolytic voltage is in a range from 2.8 V to about 3.5 V. After the electrolytic voltage is applied, an electrochemical oxidation reaction is continuously conducted, and an electrochemical reduction is continuously conducted to decompose the CO2 gas to form the expected products. The expected products can be useful organic substances.

More specifically, in the cathode chamber 22, a three-phase reaction is conducted in the porous conductive layer 2202. The liquid cathode electrolyte and the $CO_2$ gas are reacted under an action of the solid cathode catalyst particles 2204 to electrochemically reduce the $CO_2$ gas. The cathode electrolyte trickled on the cathode 220 appears as a film and flows on the surface of the cathode catalyst particles 2204 to increase a contact area thereof. The electrochemical reduction reaction is effective and fast because of the large contact area of the cathode electrolyte and $CO_2$ gas with the cathode catalyst particles 2204 which are disposed in a porous structure. In addition, because of the certain thickness of the porous conductive layer 2202, the cathode electrolyte and $CO_2$ gas can continuously flow through the surface of the cathode catalyst particles 2204 with a high flux to increase the conversion efficiency of the electrochemical reduction. The direction of the thickness of the porous conductive layer 2202 is the same as a current direction of the corresponding electrolytic voltage. The cathode electrolyte includes a first solvent and a first solute dissolved in the first solvent. The first solute can be at least one of an alkali metal bicarbonate, alkali metal formate, ammonium bicarbonate, and ammonium formate. The alkali metal bicarbonate can be at least one of sodium bicarbonate, potassium bicarbonate, and a hydrate thereof. The alkali metal formate can be at least one of sodium formate, potassium formate, and a hydrate thereof. The first solvent can be water. Anions can be formed after the three-phase reaction in the cathode chamber 22 which is decided by the kind of the cathode electrolyte. In one embodiment, the anion anions are formate ions. In addition, a cathode side reaction occurs during the three-phase reaction and a cathode byproduct is formed. In one embodiment, the cathode byproduct is the hydrogen gas. The cathode side reaction can be represented by: $2H_2O+2e^- \rightarrow H_2+2OH^-$. A pH value of the cathode electrolyte can be large than or equal to 7. A reaction temperature in the cathode chamber 22 can be in a range from about 20° C. to about 90° C. In one embodiment, the reaction temperature in the cathode chamber 22 is about 50° C.

In the anode chamber 24, the anode electrolyte and the anode active material are fed in the anode inlet 242, flowed to uniformly disperse the anode electrolyte and the anode active material, passed through the porous diffusion layer 2402, and electrochemically oxidized under the action of the anode catalyst layer 2404. The anode electrolyte includes a second solvent and a second solute dissolved in the second solvent. The second solvent can be water. The second solute can be an alkali metal hydroxide, alkali salt, ammonium salt, or an acid. In one embodiment, the second solute can be sodium hydroxide, sodium sulfate, ammonium sulfate, or sulfuric acid. The anode active material can be the same as the second solute. The electrochemical oxidation can form a plurality of residual cations decided by the kind of the anode active material, such as sodium cations, potassium cations, or ammonium cations. The residual cations can pass through the solid electrolyte separator 260 and neutralized with the anions to form the expected products, such as formate salts. Anode side reaction also occurs along with the electrochemical oxidation to form an anode by-product. In one embodiment, the anode by-product is oxygen gas. The anode side reaction can be represented as: $2OH^- \rightarrow \frac{1}{2}O_2+2H_2O+2e^-$ or $2H_2) \rightarrow O_2+2H^++2e^{31}$. A reaction temperature in the anode chamber 24 can be in a range from about 20° C. to about 90° C. A concentration of the anode electrolyte can be in a range from about 0 wt % to about 10 wt %.

The method further includes a step of separating the expected products, the cathode byproduct, and the unreacted cathode electrolyte from the cathode outlet 224. If the cathode byproduct is hydrogen gas, the hydrogen gas can be separated by a gas-liquid separator and collected. In addition, the separated cathode electrolyte can be fed back to the cathode inlet 222 for a recycling use.

The method further includes separating the anode byproduct and unreacted anode electrolyte. If the anode byproduct is oxygen gas, the oxygen gas can be separated and collected, and the separated anode electrolyte can be fed back to the anode inlet 242 for a recycling use.

If the cathode byproduct is the hydrogen gas and the anode byproduct is the oxygen gas, the hydrogen gas can act as the fuel and the oxygen gas can act as the oxidant fed to the fuel cell to generate power. Water, reacted by the hydrogen gas and the oxygen gas, can function as a solvent fed back to the cathode electrolyte or anode electrolyte for a recycling use. Therefore, an energy consumption of the membrane reactor 10 or 100 can be decreased and an energy recycling rate can be increased. A conversion efficiency of the membrane reactor 10 or 100 can reach above 80%.

Example 1

In the cathode 220 of the membrane reactor 10 or 100, a porous titanium mesh with a thickness of about 10 millimeters and a porosity of about 60% is used as the porous conductive layer 2202. Highly dispersed Sn/Cu alloy particles are used as the cathode catalyst particles 2204 deposited in the holes of the porous conductive layer 2202. In the anode 240 of the membrane, a carbon paper is used as the porous diffusion layer 2402, and nickel powders as the anode catalyst are deposited on the surface of the carbon paper to form the anode 240. The perfluoro sulfonate membrane enhanced by a polytetrafluoroethylene network with a thickness of about 150 micrometers is used as the solid electrolyte separator 260. The solid electrolyte separator 260 and the anode 240 are hot pressed to form a composite structure. An air-cooled proton exchange membrane fuel cell is used as the charge power supply 34.

Purified $CO_2$ gas generated from a coal-fire power station is boosted to about 2 atmospheres of pressure by a booster. A $NaHCO_3$ water solution as the cathode electrolyte and the boosted $CO_2$ gas are concurrently fed in the cathode inlet 222 and flowed through the porous titanium mesh with the Sn/Cu alloy particles deposited therein. The $CO_2$ gas is electrochemically reduced and formate anions are formed in the cathode chamber 22 under the electrolytic voltage of about 3 V. At the same time, NaOH as the anode active material and NaOH water solution as the anode electrolyte are fed in the anode inlet 242, uniformly dispersed in the anode chamber 24, and passed through the carbon paper to the anode catalyst layer to be electrochemically oxidized. Unreacted $Na^+$ ions are passed through the solid electrolyte separator 260 and combined with the formate anions to form sodium formate. The sodium formate as the expected product is separated and recycled. The hydrogen gas as the cathode byproduct and the oxygen gas as the anode byproduct are collected and fed back to the fuel cell to generate power for the membrane reactor 10. In addition, water as the reaction product of the hydrogen gas and the oxygen gas is fed back for the cathode electrolyte or the anode electrolyte as the solvent. The testing results show that a current efficiency of the membrane 10 reaches to about 85%, the conversion efficiency of the $CO_2$ gas reaches to about 90%. In addition, the membrane reactor 10 can convert above 100 tons of the $CO_2$ gas per day.

Example 2

The membrane reactor 10 and the converting process of the $CO_2$ of this example is the same as the membrane reactor 10 of Example 1, except that a porous nickel mesh with a thickness of about 2.1 millimeters and a porosity of about 31% is used as the porous conductive layer 2202. Cd/In alloy particles which are electroplated on the support skeleton of the porous nickel mesh are used to form the cathode catalyst particles 2204. A mixture of the $MnO_2$ powders and Ag powders is used to form the anode catalyst layer 2404. The solid electrolyte separator 260 is the perfluorocarboxylic acid membrane enhanced by a porous polytetrafluoroethylene film with a thickness of about 52 micrometers. The self-humidifying proton exchange membrane fuel cell is used as the charge power supply 34. The CO2 gas is generated from a heating boiler. The cathode electrolyte is a $KHCO_3$ water solution. The electrolytic voltage is about 3.5 V. The expected products are potassium formate. The current efficiency of the membrane reactor 10 reaches to about 80%, and the conversion efficiency reaches about 82%.

Example 3

The membrane reactor 10 and the converting process of the $CO_2$ gas of this example is the same as the membrane reactor 10 of Example 1, except that a porous stainless steel mesh with a thickness of about 20 millimeters and a porosity of about 90% is used as the porous conductive layer 2202. A mixture of Bi particles and Zn particles which are electroplated on the support skeleton of the porous stainless steel mesh is used to form the cathode catalyst particles 2204. A porous nickel mesh is used as the porous diffusion layer 2402. A mixture of the $LaNi_5$ powders and Co powers is sprayed on the surface of the porous nickel mesh to form the anode catalyst layer 2404. The solid electrolyte separator 260 is a composite of the enhanced perfluorocarboxylic acid membrane and perfluorocarboxylic acid membrane with a thickness of about 200 micrometers. The solid oxide fuel cell is used as the charge power supply 34. The $CO_2$ gas is purified and boosted to about 5 atmosphere of pressure. The electrolytic voltage is about 2.8 V. The anode active material is ammonia. The anode electrolyte is an ammonium sulfate water solution. The expected product is the ammonium formate. The testing results show that the current efficiency of the membrane reactor 10 reaches to about 90%, and the conversion efficiency of the $CO_2$ gas reaches to about 92%.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A membrane reactor used for electrochemically converting a carbon dioxide gas into an expected product, the membrane reactor comprising:
    a cavity;
    a solid electrolyte membrane separator disposed in the cavity and dividing the cavity into two chambers defined as a cathode chamber and an anode chamber, wherein the solid electrolyte membrane separator is a composite of an enhanced perfluorooctane sulfonate membrane and perfluorocarboxylic acid membrane with a thickness of about 200 micrometers;
    a cathode disposed in the cathode chamber, the cathode being a trickle bed structure comprising a porous conductive layer and a plurality of cathode catalyst particles disposed on the porous conductive layer, wherein the porous conductive layer comprises a plurality of through holes, and the plurality of through holes extend from one side to another side along a thickness direction of the porous conductive layer in a curvy manner; the plurality of cathode catalyst particles comprise a mixture of bismuth particles and zinc particles deposited on a support skeleton of the porous conductive layer; and a porosity of the porous conductive layer is about 90% with a thickness of about 20 millimeters;
    an anode disposed in the anode chamber, wherein the anode, the solid electrolyte membrane separator, and the porous conductive layer are stacked together to form a membrane shaped structure, the thickness direction extends from the anode to the porous conductive layer;

the anode comprises a porous diffusion layer and an anode catalyst layer disposed on a surface of the porous diffusion layer; and the anode catalyst layer comprises $LaNi_5$ powders and Co powders disposed on a surface of the porous diffusion layer; and a power source disposed outside the cavity to provide an electrolytic voltage.

2. The membrane reactor of claim 1, wherein the cathode chamber comprises a cathode inlet for feeding a cathode electrolyte and the carbon dioxide gas in the cathode inlet, the cathode electrolyte exhibiting as liquid drops are trickled through the plurality of cathode catalysts and the carbon dioxide gas is continuously passed through the plurality of cathode catalyst particles at the same time.

3. The membrane reactor of claim 1, wherein a material of the porous conductive layer is resistant to corrosion selected from the group consisting of a metal and an alloy.

4. The membrane reactor of claim 1, wherein the power source comprises an electrochemical power supply.

5. The membrane reactor of claim 4, wherein the power source further comprises a direct current power supply electrically connected with the electrochemical power supply in parallel, the direct current power supply is used to directly provide electric energy for the electrochemical conversion of the $CO_2$ gas, and the electrochemical power supply is used to charge the direct current power supply.

6. The membrane reactor of claim 5, wherein the power source further comprises a power controller electrically connected with the direct current power supply and the charge power supply in parallel, and used to convert the power generated by the charge power supply into a direct current power needed by the membrane reactor.

7. The membrane reactor of claim 1 further comprising a booster to boost the carbon dioxide gas into the cathode chamber.

8. A membrane reactor configured to electrochemically convert carbon dioxide gas into an expected product, the membrane reactor comprising:

a cavity;

a solid electrolyte membrane separator disposed in the cavity and dividing the cavity into two chambers defined as a cathode chamber and an anode chamber;

a cathode disposed in the cathode chamber, the cathode being a trickle bed structure consisting of a porous conductive layer and a plurality of cathode particles, wherein the porous conductive layer defines a plurality of through holes, the plurality of through holes are curved and extend from one side to another side along a thickness direction of the porous conductive layer in a curvy manner, and all of the plurality of cathode catalyst particles are deposited on inner walls of the through holes;

an anode disposed in the anode chamber, wherein the anode, the solid electrolyte membrane separator, and the porous conductive layer are stacked together to form a membrane shaped structure, the thickness direction extends from the anode to the porous conductive layer; and a power source disposed outside the cavity to provide an electrolytic voltage.

9. The membrane reactor of claim 8, wherein the solid electrolyte membrane separator is a perfluoro sulfonate membrane enhanced by a polytetrafluoroethylene network.

10. The membrane reactor of claim 8, wherein the solid electrolyte membrane separator is a perfluorocarboxylic acid membrane enhanced by a porous polytetrafluoroethylene film.

11. The membrane reactor of claim 9, wherein the anode comprises a porous diffusion layer and an anode catalyst layer disposed on a surface of the porous diffusion layer; a material of the anode catalyst layer is a mixture of the $MnO_2$ powders and Ag powders or a mixture of the $LaNi_5$ powders and Co powers.

12. The membrane reactor of claim 9, the material of the plurality of cathode catalyst particles is Sn/Cu alloy, the anode catalyst layer consists of nickel powders, and the solid electrolyte separator is a perfluoro sulfonate membrane enhanced by a polytetrafluoroethylene network with a thickness of about 150 micrometers.

* * * * *